(12) United States Patent
Ke et al.

(10) Patent No.: US 11,863,630 B2
(45) Date of Patent: Jan. 2, 2024

(54) CONNECTION ESTABLISHMENT METHOD, SERVER, ACCESSED NODE, ACCESS NODE, AND STORAGE MEDIUM

(71) Applicant: Beijing Baidu Netcom Science Technology Co., Ltd., Beijing (CN)

(72) Inventors: Yugang Ke, Beijing (CN); Yongqiang Wu, Beijing (CN); Minglu Li, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/985,341

(22) Filed: Nov. 11, 2022

(65) Prior Publication Data

US 2023/0291802 A1   Sep. 14, 2023

(30) Foreign Application Priority Data

Mar. 11, 2022   (CN) .......................... 202210238577.0

(51) Int. Cl.
| | | |
|---|---|---|
| *H04L 67/141* | (2022.01) | |
| *H04L 45/02* | (2022.01) | |
| *H04L 61/256* | (2022.01) | |

(52) U.S. Cl.
CPC ............ *H04L 67/141* (2013.01); *H04L 45/02* (2013.01); *H04L 61/256* (2013.01)

(58) Field of Classification Search
CPC ...... H04L 67/141; H04L 45/02; H04L 61/256
See application file for complete search history.

(56) References Cited

U.S. PATENT DOCUMENTS

| | | |
|---|---|---|
| 2005/0238034 A1 | 10/2005 | Gillespie et al. |
| 2008/0201480 A1* | 8/2008 | He .................... H04L 61/2578 709/227 |

(Continued)

FOREIGN PATENT DOCUMENTS

| | | |
|---|---|---|
| CN | 101217482 A | 7/2008 |
| CN | 101730997 A | 6/2010 |

(Continued)

OTHER PUBLICATIONS

Gao, et al.: "Implement Scheme of Communication Between Extranet and Intranet Based on UDP," Journal of Liaoning Univ. of Petrolium & Chemical Technology, 25(4), (2005), pp. 75-78, English-language abstract only.

(Continued)

*Primary Examiner* — Brian J. Gillis
*Assistant Examiner* — Thao D Duong
(74) *Attorney, Agent, or Firm* — Norton Rose Fulbright US LLP; James R. Crawford

(57) ABSTRACT

Provided are a connection establishment method, a server, an accessed node, an access node, and a storage medium. The method includes: receiving a connection establishment request from an accessed node, establishing a connection to the accessed node, and acquiring accessed connection information of the accessed node; receiving an accessed address request from an access node and determining access connection information of the access node; sending the access connection information to the accessed node so that the accessed node opens up a connection channel between the access node and the accessed node according to the access connection information; and sending the accessed connection information of the accessed node to the access node so that the access node establishes a connection to the accessed (Continued)

node according to the accessed connection information in the case where the connection channel is opened up.

16 Claims, 8 Drawing Sheets

(56) References Cited

U.S. PATENT DOCUMENTS

| | | | |
|---|---|---|---|
| 2011/0246577 A1* | 10/2011 | Self | H04L 67/104 709/204 |
| 2011/0270994 A1* | 11/2011 | Ulupinar | H04W 76/15 709/227 |
| 2011/0276703 A1* | 11/2011 | Weizman | H04L 69/161 709/228 |
| 2012/0210008 A1* | 8/2012 | Hsieh | H04L 61/4535 709/227 |
| 2012/0246301 A1* | 9/2012 | Vyrros | A63F 13/34 709/224 |
| 2014/0289791 A1 | 9/2014 | Acharya et al. | |
| 2016/0173444 A1* | 6/2016 | Nistor | H04L 61/2578 709/224 |
| 2019/0327220 A1* | 10/2019 | Huber | H04L 63/18 |
| 2020/0213273 A1* | 7/2020 | Periyaeluvan | H04L 61/45 |
| 2020/0213403 A1* | 7/2020 | Yang | H04L 67/562 |
| 2021/0378039 A1* | 12/2021 | Cherian | H04W 8/24 |
| 2022/0029697 A1* | 1/2022 | Bakr | H04B 7/0695 |
| 2022/0386166 A1* | 12/2022 | Sarker | H04W 28/0273 |
| 2022/0417302 A1* | 12/2022 | Saxena | H04L 65/1045 |

FOREIGN PATENT DOCUMENTS

| | | |
|---|---|---|
| CN | 104065620 A | 9/2014 |
| CN | 105429844 A | 3/2016 |
| CN | 106790758 A | 5/2017 |
| CN | 108600204 A | 9/2018 |
| CN | 110611692 A | 12/2019 |
| CN | 110809045 A | 2/2020 |
| CN | 111314458 A | 6/2020 |
| CN | 113660356 A | 11/2021 |

OTHER PUBLICATIONS

First Search Report issued by the CIPO in corresponding patent application No. 2022102385770 dated Mar. 16, 2023, with English translation.

Office Action dated Mar. 20, 2023 by the CIPO in the corresponding Patent Application No. 202210238577.0, with English translation.

Supplemental Search Report issued by the CIPO in corresponding patent application No. 2022102385770 dated Jun. 20, 2023, with English translation.

* cited by examiner

CONNECTION ESTABLISHMENT METHOD, SERVER, ACCESSED NODE, ACCESS NODE, AND STORAGE MEDIUM

CROSS-REFERENCE TO RELATED APPLICATION(S)

This application claims priority to Chinese Patent Application No. 202210238577.0 filed Mar. 11, 2022, the disclosure of which is incorporated herein by reference in its entirety.

TECHNICAL FIELD

The present disclosure relates to the field of communications, may be applied in cloud computing, Internet of Things, and media cloud scenarios, and in particular, relates to a connection establishment method and apparatus, an electronic device, and a storage medium.

BACKGROUND

With the development of edge computing technology, a large number of devices are deployed on the intranet (access to a network via a network address translation (NAT) proxy of a router), and a connection to intranet devices is an important technology for the edge computing.

In the existing Internet network environment, the intranet devices are usually located behind an NAT device or a firewall. The NAT device allows a host on the intranet to actively initiate a connection to a public network server, but prohibits an active connection in the opposite direction.

SUMMARY

The present disclosure provides a connection establishment method and apparatus, an electronic device, and a storage medium.

According to an aspect of the present disclosure, a connection establishment method is provided and applied to a server. The method includes steps described below.

A connection establishment request is received from an accessed node, a connection to the accessed node is established, and accessed connection information of the accessed node is acquired.

An accessed address request is received from an access node and access connection information of the access node is determined.

The access connection information is sent to the accessed node so that the accessed node opens up a connection channel between the access node and the accessed node according to the access connection information.

The accessed connection information of the accessed node is sent to the access node so that the access node establishes a connection to the accessed node according to the accessed connection information in the case where the connection channel is opened up.

According to an aspect of the present disclosure, a connection establishment method is provided and applied to an accessed node. The method includes steps described below.

A connection establishment request is sent to a server and a connection to the server is established so that the server acquires and forwards accessed connection information to an access node.

Access connection information of the access node is received from the server.

Hole punching data is sent to the access node according to the access connection information so as to open up a connection channel between the access node and the accessed node.

The connection establishment request is received from the access node according to the accessed connection information and a connection to the access node is established.

According to an aspect of the present disclosure, a connection establishment method is provided and applied to an access node. The method includes steps described below.

An accessed address request is sent to a server so that the server acquires and forwards access connection information to an accessed node, and the accessed node opens up a connection channel between the access node and the accessed node according to the access connection information.

Accessed connection information of the accessed node is received from the server.

In the case where the connection channel is opened up, a connection to the accessed node is established according to the accessed connection information.

According to another aspect of the present disclosure, an electronic device is provided. The electronic device includes at least one processor and a memory communicatively connected to the at least one processor.

The memory stores instructions executable by the at least one processor to cause the at least one processor to perform the connection establishment method according to any embodiment of the present disclosure.

According to another aspect of the present disclosure, a non-transitory computer-readable storage medium is provided. The storage medium stores computer instructions for causing a computer to perform the connection establishment method according to any embodiment of the present disclosure.

In embodiments of the present disclosure, the access cost can be reduced and the access success rate can be improved.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

The drawings are intended to provide a better understanding of the solution and not to limit the present disclosure.

DETAILED DESCRIPTION

Figure 1:
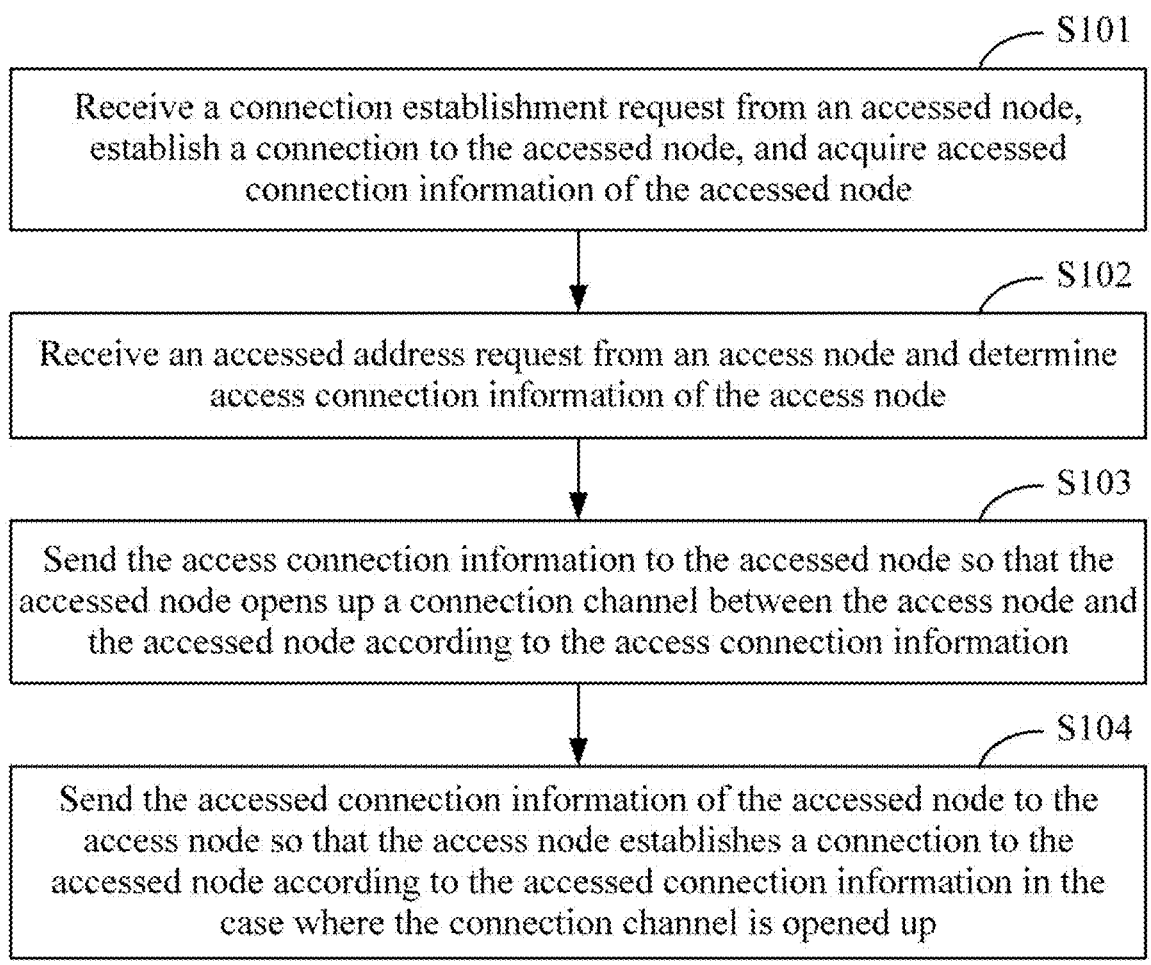
FIG. 1 is a schematic diagram of a connection establishment method according to an embodiment of the present disclosure.

Example embodiments of the present disclosure, including details of embodiments of the present disclosure, are described hereinafter in conjunction with drawings to facilitate understanding. The example embodiments are illustrative only. Therefore, it is to be appreciated by those of ordinary skill in the art that various changes and modifications may be made to the embodiments described herein without departing from the scope and spirit of the present disclosure. Similarly, description of well-known functions and constructions is omitted hereinafter for clarity and conciseness.

In the embodiments of the present disclosure, a connection establishment system for implementing a connection establishment method includes an access node, an accessed node, and a server, and the access node needs to establish a connection to the accessed node. The accessed node is located behind the NAT device, and the NAT device protects the accessed node on the intranet so that the access node on the extranet cannot directly communicate with the accessed node. The accessed node may be registered in the server in advance, and associated information is stored in the server. The access node accesses the server, acquires information of the accessed node through the server, and establishes a connection to the accessed node.

The server is configured to assist the access node to establish a connection to the accessed node. The access node may refer to a node that needs to establish a connection to the accessed node. The accessed node may refer to an intranet node located behind the NAT device. The access node may be a node located behind the NAT device or may not be located behind the NAT device, that is, the access node may also be another intranet node or may directly be an extranet node. It is to be noted that the access node may be an intranet node located on the same intranet as the accessed node or may be an intranet node located on a different intranet from the accessed node. Actually, the access node may be a node in any network environment, and the network environment of the access node is not limited.

The accessed node sends data packet 1 to the server, the data packet 1 goes through the NAT device, a source Internet Protocol (IP) address of the data changes from X.X.X.X to Y.Y.Y.Y, and port A is mapped to port B. In this manner, an address for connection to the server on the public network changes from a private address of the intranet to a public network address, and the NAT device hides the private address used internally and records corresponding addresses translated between the intranet and the extranet in an address translation table. When the server on the intranet sends a message to the accessed node on the intranet and the accessed node returns data packet 2, the data packet 2 goes through the NAT device, the NAT device queries a target address of the data packet and finds an address mapping relationship in a network address translation table, and an original target address Y.Y.Y.Y:B is replaced with X.X.X.X: A, thereby achieving data communication between the intranet and the extranet. If the accessed node has never communicated with the server, the data packet actively sent by the server to the accessed node is blocked. The type of the NAT device through which the accessed node sends data to the extranet is not limited. When data sent by the access node also goes through the NAT device, the type of the NAT device through which the data goes is also not limited.

FIG. 1 is a flowchart of a connection establishment method according to an embodiment of the present disclosure. This embodiment is applicable to the case where a communication connection is established between an accessed node and an access node. The method of this embodiment may be performed by a connection establishment apparatus. The apparatus may be implemented by software and/or hardware and is specifically configured in an electronic device having a certain data computing capability. The electronic device may be a server device.

In S101, a connection establishment request is received from an accessed node, a connection to the accessed node is established, and accessed connection information of the accessed node is acquired.

The connection establishment request is used for establishing a connection between the accessed node and the server. The accessed connection information is used for acquiring the access node so that the access node establishes a connection to the accessed node according to the accessed connection information. The accessed connection information may refer to an accessed address required by the access node to connect to the accessed node, where the accessed address specifically includes an IP address and a port.

The accessed node is behind the NAT device, the server starts to be unable to actively send information to the accessed node, and only after the accessed node sends information to the server, can the server actively send information to the accessed node. The server may establish a long connection to the accessed node.

In S102, an accessed address request is received from an access node and access connection information of the access node is determined.

The accessed address request is used for the access node to request to acquire the accessed address of the accessed node. The accessed address is used for the accessed node to access the access node. The access node may establish a short connection to the server.

In S103, the access connection information is sent to the accessed node so that the accessed node opens up a connection channel between the access node and the accessed node according to the access connection information.

The access connection information is sent to the accessed node, and the access connection information carries an access address of the access node and is used for the accessed node to send data to the access address so that the accessed node can actively send data to the access node, thereby opening up the connection channel between the access node and the accessed node. Actually, the accessed node is located behind the NAT device, and the NAT device blocks data sent by the access node which the accessed node has not communicated to. Therefore, first the accessed node needs to actively send data to the access node, so as to open up the connection channel between the access node and the accessed node, so that the NAT device does not block the data sent from the access node to the accessed node, and the connection between the access node and the accessed node is established. One connection channel corresponds to one access address, that is, one connection channel corresponds to an IP address and a port of one access node.

In S104, the accessed connection information of the accessed node is sent to the access node so that the access node establishes a connection to the accessed node according to the accessed connection information in the case where the connection channel is opened up.

The accessed connection information is sent to the access node, and the accessed connection information carries the accessed address of the accessed node and is used for the access node to send data to the accessed address, so as to establish a connection between the access node and the accessed node.

In the related art, the existing Session Traversal Utilities for NAT (STUN) network protocol allows a client behind the NAT (or multiple NATs) to find out its own public network address, after which type of NAT the client is located, and an Internet port to which the NAT is bound for a local port. The NAT traversal technology based on the STUN network protocol requires Traversal NAT (TNAT) applications run on both sides of the connection. However, there are actually many scenarios in which the access node does not have the STUN function and does not support TNAT applications, such as browsers or lightweight clients. The access node without the STUN function cannot implement NAT traversal and establish a connection to the node behind the NAT.

According to the technical solution of the present disclosure, the connection establishment request is acquired from the accessed node, the accessed connection information of the accessed node is acquired, the accessed address request is received from the access node, the access connection information of the access node is acquired, and the access connection information is sent to the accessed node. In this manner, the accessed node opens up the connection channel between the access node and the accessed node and sends the accessed connection information to the access node so that the access node establishes a connection to the accessed node through the opened connection channel. Therefore, a connection assistance function of the accessed node is provided for the access node that does not support the TNAT function, a connection between the access node and the accessed node behind the NAT device is achieved, and the access node does not need to have the TNAT device function, thereby reducing the access cost of the intranet node, reducing the complexity of the access node, enriching application scenarios of the access node, and improving the access efficiency of the intranet node.

Figure 2:
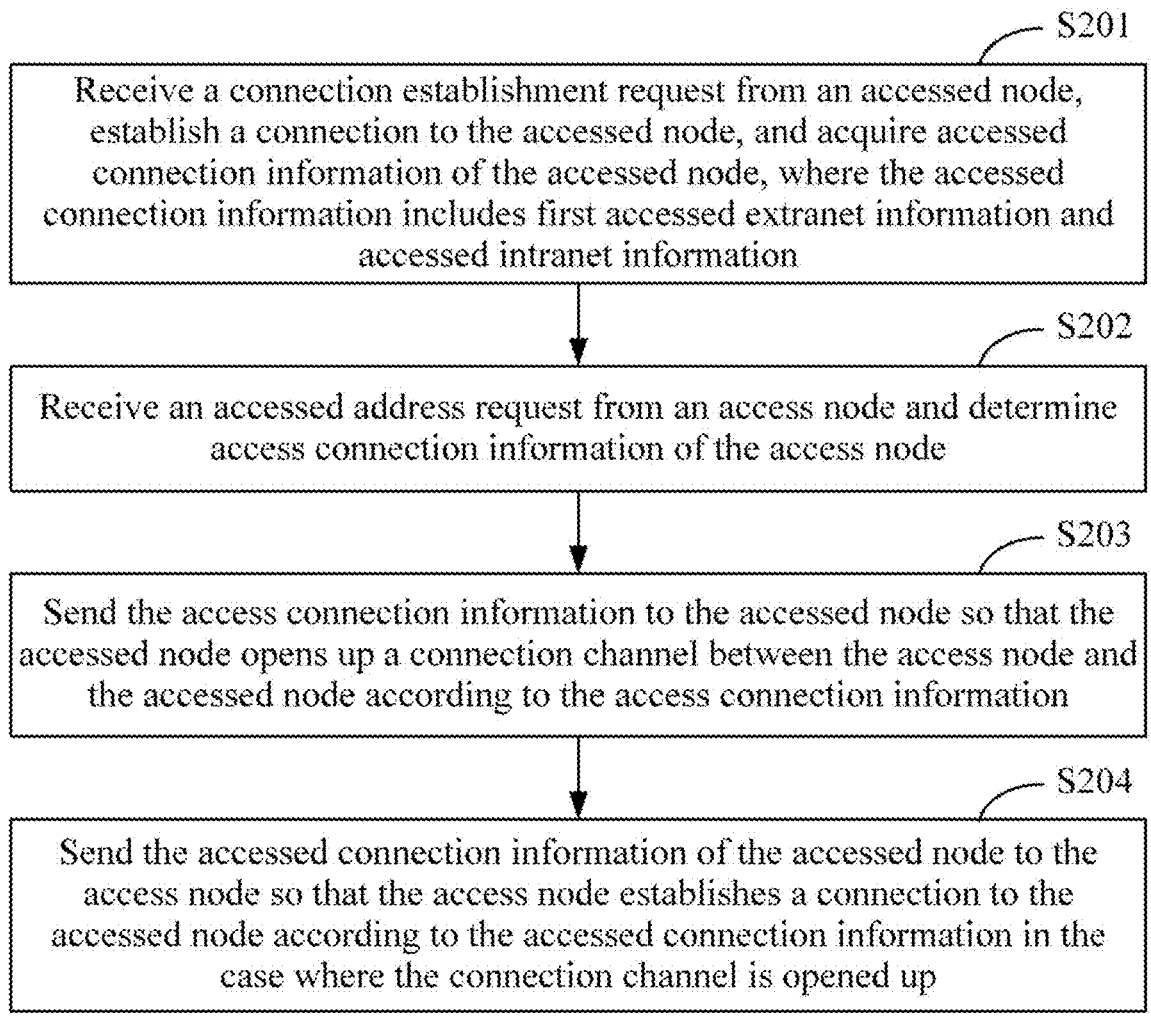
FIG. 2 is a schematic diagram of another connection establishment method according to an embodiment of the present disclosure.

FIG. 2 is a flowchart of another connection establishment method according to an embodiment of the present disclosure. This embodiment is an optimization and expansion of the preceding technical solution and can be combined with each preceding optional implementation. The accessed connection information includes first accessed extranet information and accessed intranet information.

In S201, a connection establishment request is received from an accessed node, a connection to the accessed node is established, and accessed connection information of the accessed node is acquired, where the accessed connection information includes first accessed extranet information and accessed intranet information.

The accessed connection information includes accessed extranet information and accessed intranet information of the accessed node. The accessed extranet information may include an accessed extranet IP address and an accessed extranet port; and the accessed intranet information may include an accessed intranet IP address and an accessed intranet port. The connection establishment request includes the accessed intranet information and the accessed extranet information. Specifically, the connection establishment request generated by the accessed node includes only the accessed intranet information, the connection establishment request goes through the NAT device, and part of the accessed intranet information in the connection establishment request is mapped to the accessed extranet information so that the connection establishment request including both the accessed intranet information and the accessed extranet information is formed and sent to the server. The connection establishment request received by the server includes the accessed intranet information and the accessed extranet information. The server extracts the accessed connection information from the connection establishment request. By way of example, the accessed extranet information may be extracted from a packet header in the connection establishment request, the accessed intranet information may be extracted from a packet body, and the extracted accessed extranet information and accessed intranet information are determined to be the accessed connection information.

The first accessed extranet information may be the accessed extranet information formed by mapping the accessed intranet information in the case where the accessed node sends the connection establishment request.

After a connection between the server and the accessed node is established, the server may also reply to the accessed node with a successful connection establishment message. Moreover, the server records a piece of data for the accessed node, where the data includes ([server IP address, service port], [first extranet IP address of the accessed node, first extranet port of the accessed node], [intranet IP address of the accessed node, intranet port of the accessed node]). If the extranet address of the accessed node changes, the record is updated in time.

In S202, an accessed address request is received from an access node and access connection information of the access node is determined.

The accessed address request includes access intranet information and access extranet information. In the case where the access node is not behind the NAT device or the access node is not an intranet node, the access intranet information and the access extranet information are the same and can be collectively referred to as access information. The access extranet information may include an access extranet IP address and an access extranet port; and the access intranet information may include an access intranet IP address and an access intranet port. For the acquisition of the access connection information, reference may be made to a method for acquiring the accessed connection information.

Actually, the access node and the accessed node are on the same intranet, and the access node may directly establish a connection to the accessed node through the intranet IP address and the intranet port of the accessed node. In the case where the access node and the accessed node are not on the same intranet, for example, the access node is on the extranet and the accessed node is on the intranet, the access node may establish a connection to the accessed node through the extranet IP address and the extranet port of the accessed node.

Optionally, determining the access connection information of the access node includes acquiring first initial information of the access node according to the accessed address request; determining candidate information of the access node according to the first initial information and a first port adjustment amount; and determining the candidate information and the first initial information to be the access connection information of the access node.

For a cone NAT, no matter which extranet node communicates with the same port of the same intranet node, the allocated port does not change; and for a symmetric NAT, each time the same port of the same intranet node communicates with a different extranet node, another port is reallocated. Actually, in the case where the access node is located behind the NAT device, the NAT device is symmetric, and the access node sends the accessed address request to the server, the access node sends the connection establishment request to the accessed node. At this time, this request goes through the NAT device, and the NAT device is allocated with a new extranet port. Therefore, the access connection information acquired by the server is the access extranet information determined for the previously allocated extranet port. Therefore, the server needs to adjust the access extranet information in the access connection information according to a port allocation method of the NAT device of the access node, obtain the access extranet port of the access node behind the symmetric NAT device, and add the access extranet port to original access extranet information so that the access extranet port is applied to the application scenario in which the access node behind the symmetric NAT device establishes a connection to the accessed node.

For the accessed address request, the first initial information of the access node may be extracted, and specifically, the first initial information may be acquired by referring to the method for acquiring the accessed connection information. The first initial information is used for determining candidate information. The first initial information may refer to the access intranet information and first access extranet information of the access node acquired by the server in the case where the access node sends the accessed address request. The first access extranet information may include a first access extranet IP address and a first access extranet port; and the access intranet information may include an access intranet IP address and an access intranet port.

The first port adjustment amount is used for adjusting the extranet port in the first initial information to obtain the extranet port for the access node to send data to the accessed node in the application scenario of the access node behind the symmetric NAT device. The first port adjustment amount may be determined according to a port allocation rule of the NAT device of the access node. By way of example, the port allocation rule of the symmetric NAT device may be increment, decrement, and hop. Specifically, in the case where the port allocation rule of the symmetric NAT device is an increment +1 rule, the first port adjustment amount is 1, and a calculation method is an increment of 1.

The candidate information may be second access extranet information for the access node to send data to the accessed node in the application scenario of the access node behind the symmetric NAT device. The candidate information may specifically include a second access extranet port or may also include a second access extranet IP address. Actually, the extranet IP address does not change as the access node sends data to different nodes. In the case where the candidate information includes a second extranet IP address, the first extranet IP address and the second extranet IP address are the same. As in the preceding example, the first access extranet port is C, and the second access extranet port is C+1. The first access extranet information is: X.X.X.X:C. Correspondingly, the second access extranet information is: X.X.X.X:C+1.

In the case where the access node is an extranet node (that is, the access extranet information is the same as the access intranet information) or an intranet node behind the cone NAT device, the access extranet port and the access extranet IP address of the access extranet information of the access node do not change with different sending targets. Therefore, the access connection information may only include the first access extranet information and the access intranet information, and the accessed node may only send data to the access node according to the first access extranet information and the access intranet information.

In the case where the access node is an intranet node located behind the symmetric NAT device, the access extranet port of the access extranet information of the access node changes with different sending targets. Therefore, the access connection information also needs to include the second access extranet information to determine the access extranet IP address and the access extranet port reallocated by the NAT device when the access node sends data to the accessed node. The accessed node may send data to the access node according to the newly allocated second access extranet information and access intranet information so as to establish a connection channel between the access node and the accessed node based on the second access extranet information.

The first initial information and the candidate information are combined, thereby determining the access connection information and acquiring access nodes in different application scenarios and the access extranet information when data is sent to the accessed node, so as to be adapted to different access nodes in different application scenarios. At the same time, type detection of the NAT device of the access node does not need to be performed, thereby simplifying a connection establishment operation.

The first initial information is acquired, the candidate information is determined according to the first port adjustment amount, and the candidate information and the first initial information are determined to be the access connection information of the access node, so as to be adapted to the access node not located on the NAT intranet or located behind the cone NAT device or the symmetric NAT device and increase the scope of application scenarios of connection establishment.

In S203, the access connection information is sent to the accessed node so that the accessed node opens up a connection channel between the access node and the accessed node according to the access connection information.

In S204, the accessed connection information of the accessed node is sent to the access node so that the access node establishes a connection to the accessed node according to the accessed connection information in the case where the connection channel is opened up.

Optionally, the server separately establishes a Quick User Datagram Protocol (UDP) Internet Connection (QUIC) connection to the accessed node and the access node.

A QUIC protocol is a transport layer protocol based on a UDP. A connection between the accessed node and the server is established by using the QUIC transport layer protocol, and a connection between the access node and the server is established by using the QUIC transport layer protocol. A connection between the accessed node and the access node is established by using the QUIC transport layer protocol. HyperText Transfer Protocol 3 (HTTP3) is an application layer protocol, the QUIC protocol is generally used for data transmission, and HTTP3 is also referred to as HTTP Over QUIC. Additionally, HTTP3 is a standard for the next generation of HTTP (currently HTTP2). The QUIC protocol may also be replaced with QUIC created by an Internet Engineering Task Force (IETF) (IQUIC), or Google QUIC (GQUIC), and other extended QUIC protocols.

The access node is any application that may use the standard QUIC/HTTP3 protocol, such as a browser. The accessed node and the server may also use the standard QUIC/HTTP3 protocol for data transmission.

The accessed node, the server, and the access node are all configured to use the QUIC/HTTP3 protocol for data transmission so that the connection success rate of the QUIC/HTTP3 protocol can be improved.

According to the technical solution of the present disclosure, the accessed connection information is configured to be the first accessed extranet information and the accessed intranet information so that the connection between the accessed node and the access node on different networks or on the same network may be established, thereby enriching the application scenarios of connection establishment.

Figure 3:
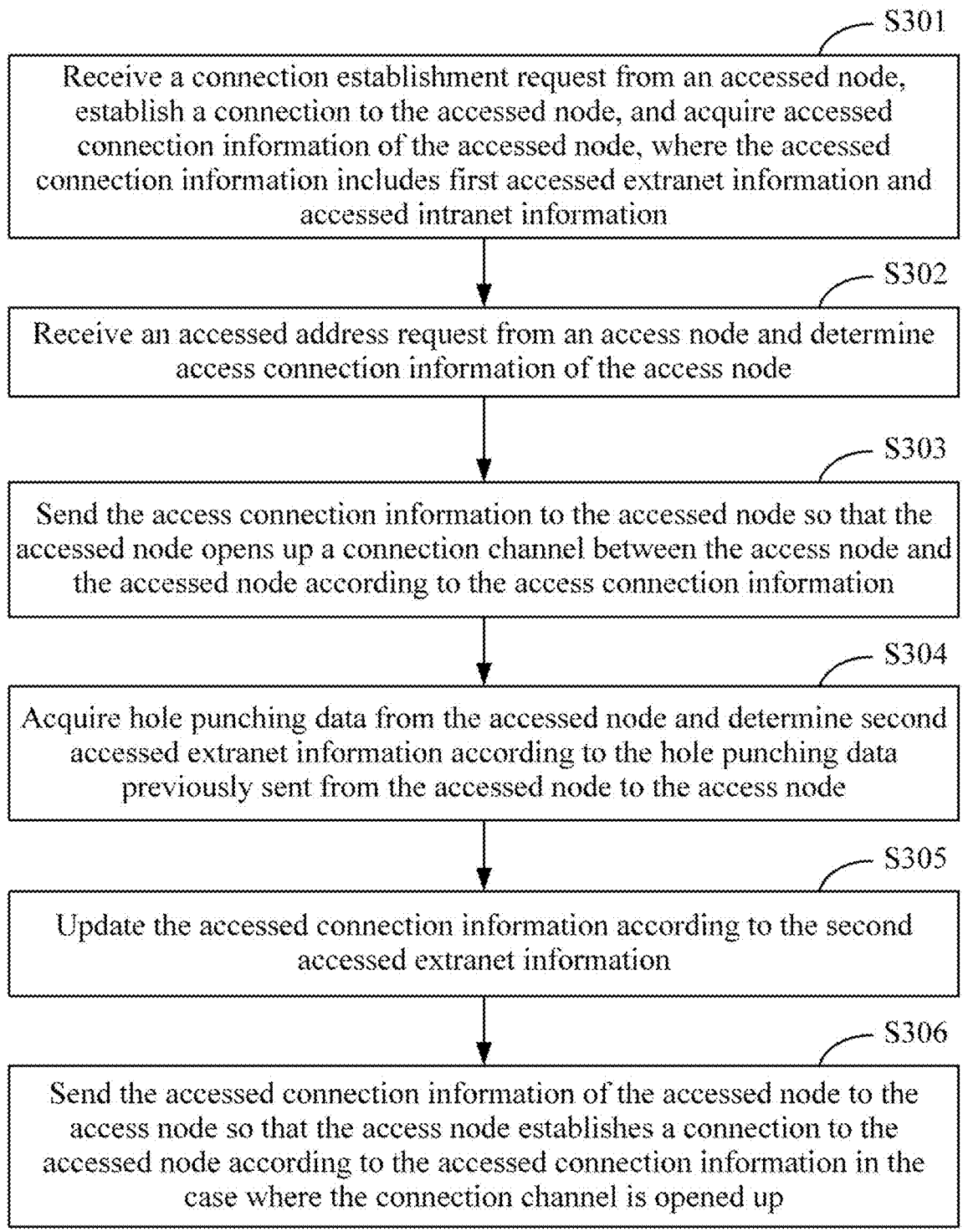
FIG. 3 is a schematic diagram of another connection establishment method according to an embodiment of the present disclosure.

FIG. 3 is a flowchart of another connection establishment method according to an embodiment of the present disclosure. This embodiment is an optimization and expansion of the preceding technical solution and can be combined with each preceding optional implementation. The connection establishment method is optimized as follows: acquiring hole punching data from the accessed node and determining second accessed extranet information according to the hole punching data previously sent from the accessed node to the access node; and updating the accessed connection information according to the second accessed extranet information.

In S301, a connection establishment request is received from an accessed node, a connection to the accessed node is established, and accessed connection information of the accessed node is acquired, where the accessed connection information includes first accessed extranet information and accessed intranet information.

In S302, an accessed address request is received from an access node and access connection information of the access node is determined.

In S303, the access connection information is sent to the accessed node so that the accessed node opens up a connection channel between the access node and the accessed node according to the access connection information.

In S304, hole punching data is acquired from the accessed node and second accessed extranet information is determined according to the hole punching data previously sent from the accessed node to the access node.

After the accessed node completes hole punching, that is, after the accessed node sends the hole punching data to the access node, the accessed node also sends the hole punching data to the server. The hole punching data is used for the server to predict the second accessed extranet information used when the accessed node sends data to the access node. Generally, the accessed node first sends the hole punching data to the access node and then sends the hole punching data to the server. The server acquires the accessed extranet information of the hole punching data and predicts and determines accessed extranet information of the data sent by the accessed node before to be the second accessed extranet information. The second accessed extranet information may refer to accessed extranet information formed by mapping the accessed intranet information in the case where the accessed node sends the hole punching data to the access node.

In the case where the accessed node is an intranet node located behind the cone NAT device, the accessed extranet port and the accessed extranet IP address of the accessed extranet information of the accessed node do not change with different sending targets. The second accessed extranet information is the same as the first accessed extranet information.

In the case where the accessed node is an intranet node located behind the symmetric NAT device, the accessed extranet port of the accessed extranet information of the accessed node changes with different sending targets. Therefore, the accessed extranet information corresponding to the hole punching data received by the access node is different from the accessed extranet information corresponding to the hole punching data received by the server, and specifically, the accessed extranet ports are different. The server may acquire current accessed extranet information of the accessed node in the case of receiving the hole punching data, adjust the current accessed extranet information according to the port allocation rule of the NAT device of the accessed node, and determine the second accessed extranet information, so as to predict the accessed extranet information used when the accessed node sends the hole punching data to the access node.

In S305, the accessed connection information is updated according to the second accessed extranet information.

The accessed connection information is updated according to the second accessed extranet information, and the second accessed extranet information may be added to the accessed connection information. In this case, the accessed connection information includes the accessed intranet information, the first accessed extranet information, and the second accessed extranet information. The first accessed intranet information is adapted to the application scenario of the accessed node behind the cone NAT device, and the second accessed extranet information is adapted to the application scenario of the accessed node behind the symmetric NAT device.

Optionally, determining the access connection information of the access node includes acquiring first initial information of the access node according to the accessed address request; determining candidate information of the access node according to the first initial information and a first port adjustment amount; and determining the candidate information and the first initial information to be the access connection information of the access node.

Optionally, determining the second accessed extranet information according to the hole punching data previously sent from the accessed node to the access node includes determining second initial information of the accessed node according to the hole punching data; determining a second port adjustment amount according to the first port adjustment amount; and adjusting the second initial information according to the second port adjustment amount to determine the second accessed extranet information of the accessed node.

The second initial information may refer to the accessed extranet information used when the accessed node sends the hole punching data to the server. The second port adjustment amount is used for adjusting the extranet port in the second initial information to obtain the extranet port for the accessed node to send the hole punching data to the server in the application scenario of the accessed node behind the symmetric NAT device. The second port adjustment amount may be determined according to the port allocation rule of the NAT device of the access node and the first port adjustment amount. Actually, due to the existence of the first port adjustment amount, the accessed node sends data to multiple access addresses of the access node, and different access addresses are correspondingly allocated with different extranet ports. Correspondingly, before sending the hole punching data to the server, the accessed node has sent the hole punching data to the multiple access addresses of the access node. Therefore, according to the number of first port adjustment amounts, the number of second port adjustment amounts is determined so as to indicate that the accessed extranet port is adjusted multiple times and determine the accessed extranet port corresponding to each operation in which the accessed node sends data to the access node. The number of the second port adjustment amounts is equal to the number of the first port adjustment amounts plus 1; according to the port allocation rule, the value of each second port adjustment amount is determined, and the second port adjustment amount is adjusted for this number based on the extranet port, so as to obtain this number of extranet ports and determine the second accessed extranet information. The adjustment method is opposite to a calculation method of the port allocation rule. For example, the port allocation rule is decrement, and the adjustment method is increment.

In a specific example, the number of the first port adjustment amounts is 1, and the number of the second port adjustment amounts is 1+1=2. The port allocation rule of the symmetric NAT device is an increment +1 rule. A sending operation of the access node comes first, and a sending operation of the server follows. The calculation method of the second port adjustment amount increment rule is opposite, and the value of the second port adjustment amount is 1. For example, the second accessed extranet port includes extranet port −1 in the second initial information and extranet port −2 in the second initial information.

The specific application scenario is described below.

The port allocation rule is increment +1. The intranet information and the extranet IP address included in the connection information remain unchanged, which is not repeated hereinafter, and only the content of the extranet port included in the connection information is described.

1. An access node not located on the NAT intranet or located behind the cone NAT device and an accessed node located behind the cone NAT device are described. The access extranet port of the access node remains unchanged. For example, when the access node sends the accessed address request to the server and when the access node sends data to the accessed node, the access extranet port of the access node is a and the access connection information includes only access extranet port a. The accessed extranet port of the accessed node remains unchanged. For example, when the accessed node sends the hole punching data to the access node and when the accessed node sends the hole punching data to the server, the accessed extranet port of the accessed node is b and the accessed connection information includes only accessed extranet port b. Actually, a denotes the access extranet port in the first initial information, and b denotes the accessed extranet port in the first accessed extranet information.

2. An access node located behind the symmetric NAT intranet and an accessed node located behind the cone NAT device are described. The access extranet port of the access node is changed. For example, when the access node sends the accessed address request to the server, the access extranet port of the access node is a, when the access node sends data to the accessed node, the access extranet port of the access node is a+1, and the access connection information includes access extranet port a and access extranet port a+1. The accessed extranet port of the accessed node remains unchanged. For example, when the accessed node sends the hole punching data to the access node and when the accessed node sends the hole punching data to the server, the accessed extranet port of the accessed node is b and the accessed connection information includes only accessed extranet port b. Actually, a denotes the access extranet port in the first initial information, a+1 denotes the access extranet port in the candidate information, and b denotes the accessed extranet port in the first accessed extranet information.

3. An access node not located on the NAT intranet or located behind the cone NAT device and an accessed node located behind the symmetric NAT device are described. The access extranet port of the access node remains unchanged. For example, when the access node sends the accessed address request to the server and when the access node sends data to the accessed node, the access extranet port of the access node is a and the access connection information includes only access extranet port a. The accessed extranet port of the accessed node is changed. For example, when the accessed node sends the hole punching data to the access node, the accessed extranet port of the accessed node is b−1, when the accessed node sends the hole punching data to the server, the accessed extranet port of the accessed node is b, and the accessed connection information includes accessed extranet port b−1 and access extranet port b. Actually, a denotes the access extranet port in the first initial information, b denotes the accessed extranet port in the first accessed extranet information, and b−1 denotes the accessed extranet port in the second accessed extranet information.

4. An access node located behind the symmetric NAT intranet and an accessed node located behind the symmetric NAT device are described. The access extranet port of the access node is changed. For example, when the access node sends the accessed address request to the server, the access extranet port of the access node is a, when the access node sends data to the accessed node, the access extranet port of the access node is a+1, and the access connection information includes access extranet port a and access extranet port a+1. The accessed extranet port of the accessed node remains unchanged. For example, when the accessed node sends the hole punching data to the access node (respectively to access extranet port a and access extranet port a+1), accessed extranet ports of the accessed node are b and b+1, when the accessed node sends the hole punching data to the server, the accessed extranet port of the accessed node is b+1+1=b+2, and the accessed connection information includes accessed extranet port b−2, accessed extranet port b−1 and accessed extranet port b. Actually, a denotes the access extranet port in the first initial information, a+1 denotes the access extranet port in the candidate information, b denotes the accessed extranet port in the first accessed extranet information, and b−1 and b−2 denote the accessed extranet ports in the second accessed extranet information.

Therefore, the first initial information and the candidate information are determined to be the access connection information, and the first accessed extranet information and the second accessed extranet information are determined to be the accessed connection information so that application scenarios of the preceding four connections may be covered, and the connection between the access node in any network environment and the accessed node behind any type of NAT device is established, thereby improving the versatility of the connection method.

It is to be noted that the above is only an example in which the port allocation rule is increment +1, which may also be replaced with increment +i, where i=1, 2, 3 . . . , or may also be replaced with decrement −i, and the like.

The second initial information of the accessed node is acquired through the hole punching data, the second initial information is adjusted according to the second port adjustment amount, the second accessed extranet information of the accessed node is determined, and the accessed connection information is updated, so as to be adapted to the connection between the access node not located on the NAT intranet or located behind the cone NAT device or the symmetric NAT device and the accessed node located behind the symmetric NAT device, thereby increasing the scope of application scenarios of connection establishment.

In S306, the accessed connection information of the accessed node is sent to the access node so that the access node establishes a connection to the accessed node according to the accessed connection information in the case where the connection channel is opened up.

The existing STUN only supports hole punching of the accessed node behind the cone NAT device. The embodiment of the present disclosure enables the server to predict the extranet port of the accessed node behind the symmetric NAT device that previously sent data to the access node, especially the extranet port of the accessed node behind the symmetric NAT device with a port increment rule that previously sent data to the access node, so as to support the hole punching of the accessed node behind the symmetric NAT device, especially the hole punching of the accessed node behind the symmetric NAT device with the port increment rule.

According to the technical solution of the present disclosure, the server receives the hole punching data from the accessed node, so as to determine the second accessed extranet information according to the hole punching data and update the accessed connection information, thereby increasing the content of the accessed connection information, so as to be adapted to the accessed node located behind the cone NAT device or the symmetric device and increase the scope of application scenarios of connection establishment. Moreover, the NAT type does not need to be acquired, thereby reducing the connection complexity of the accessed node behind the NAT and improving the connection efficiency.

Figure 4:
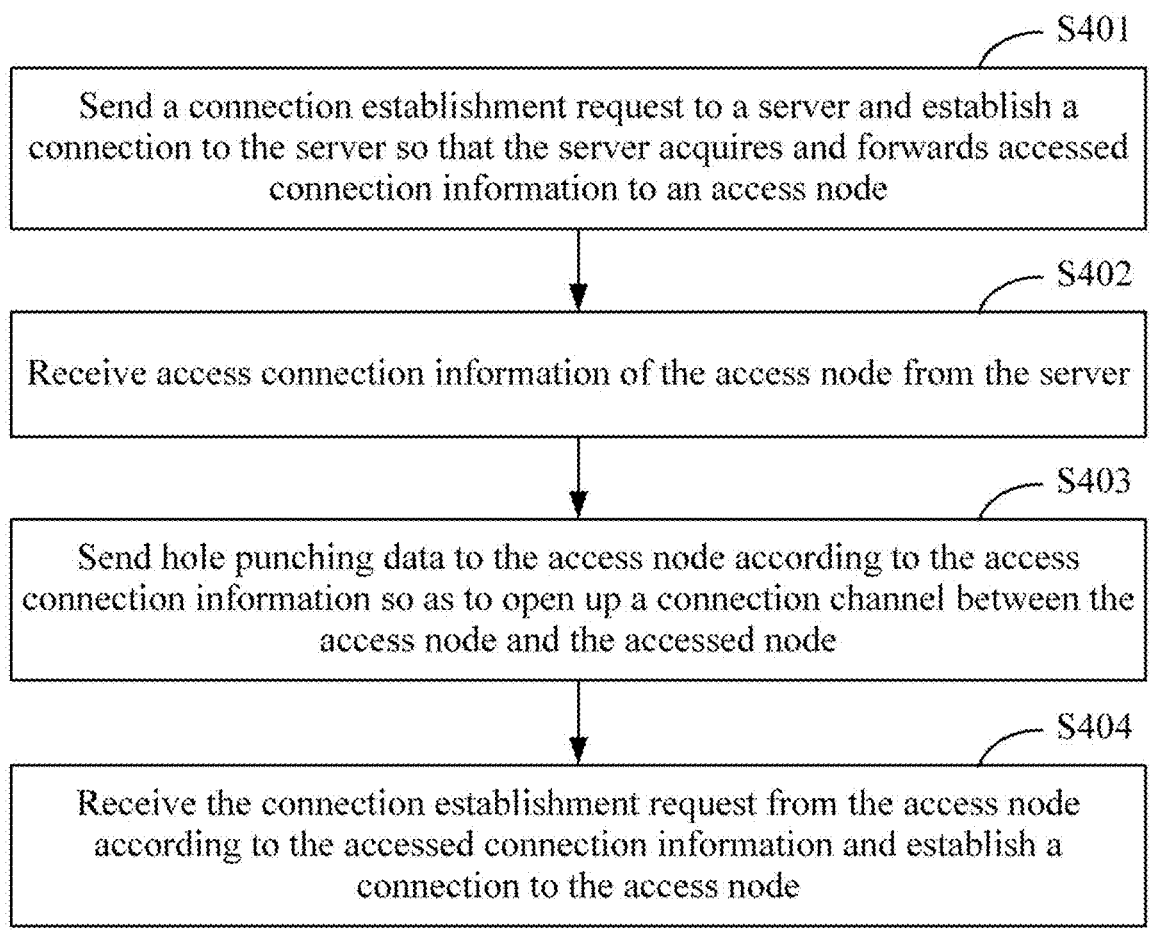
FIG. 4 is a schematic diagram of another connection establishment method according to an embodiment of the present disclosure.

FIG. 4 is a flowchart of a connection establishment method according to an embodiment of the present disclosure. This embodiment is applicable to the case where a communication connection is established between an accessed node and an access node. The method of this embodiment may be performed by a connection establishment apparatus. The apparatus may be implemented by software and/or hardware and is specifically configured in an electronic device having a certain data computing capability. The electronic device may be a client device, specifically, an accessed node. The client device is, for example, a mobile phone, a tablet computer, an in-vehicle terminal, or a desktop computer.

In S401, a connection establishment request is sent to a server and a connection to the server is established so that the server acquires and forwards accessed connection information to an access node.

A QUIC long connection to the server may be established. Moreover, a heartbeat packet is sent periodically, for example, for 30 seconds, and the content of the heartbeat packet may be the same as the content of the connection establishment request.

In S402, access connection information of the access node is received from the server.

In S403, hole punching data is sent to the access node according to the access connection information so as to open up a connection channel between the access node and the accessed node.

The hole punching data is used for the accessed node to open up the connection channel between the access node and the accessed node. The content included in the hole punching data is not limited and only needs to be pre-agreed by the accessed node and the access node. The hole punching data includes a PUNCH message. The access connection information includes at least one access extranet port of the access node. The accessed node may send the hole punching data to the corresponding connection channel according to each access extranet port, so as to be adapted to the access nodes in different application scenarios and open up the corresponding connection channel.

In S404, the connection establishment request is received from the access node according to the accessed connection information and a connection to the access node is established.

Optionally, sending the connection establishment request to the server includes sending the connection establishment request to an NAT node and sending the connection establishment request to the server through the NAT node; where the connection establishment request is used for the server to acquire the accessed connection information, where the accessed connection information includes first accessed extranet information and accessed intranet information.

The NAT node is an NAT device and used for mapping the accessed intranet information of the accessed node to the accessed extranet information, specifically, mapping the accessed intranet IP address to the accessed extranet IP address and mapping the accessed intranet port to the accessed extranet port. The accessed node is located after the NAT node, the accessed node sends the connection establishment request to the NAT node, the NAT node maps a source IP address and a source port in the connection establishment request between the intranet and the extranet, and the updated connection establishment request is sent to the server so that the server receives the connection establishment request forwarded by the NAT node. In addition, the connection establishment request further carries the accessed intranet information which will not be mapped by the NAT node. Therefore, the server may acquire the accessed intranet information, and according to the source IP address and the source port in the connection establishment request, acquire the accessed extranet information.

Due to different types of NAT nodes, the accessed extranet information may change with different connected addresses. The accessed extranet information formed when the accessed node sends the connection establishment request, that is, the NAT node forwards the connection establishment request, is determined to be the first accessed extranet information.

The NAT node maps the source IP address and the source port in the connection establishment request between the intranet and the extranet, and the updated connection establishment request is sent to the server so that the server receives the connection establishment request forwarded by the NAT node, thereby improving the security of the accessed node. At the same time, the accessed connection information is configured to be the first accessed extranet information and the accessed intranet information so that the connection between the accessed node and the access node on different networks or the same network is established, thereby enriching network application scenarios of connection establishment.

Optionally, sending the connection establishment request to the server through the NAT node includes sending the connection establishment request to the server through the NAT node according to first transmission attribute information, where the accessed intranet information is mapped through the NAT node based on the first transmission attribute information so as to obtain the first accessed extranet information; the method further includes in the case where the hole punching data is sent to the access node, sending the hole punching data to the NAT node and sending the hole punching data to the server through the NAT node according to second transmission attribute information so that the server acquires second initial information and determines second accessed extranet information; where the accessed intranet information is mapped through the NAT node based on the second transmission attribute information so as to obtain the second initial information, and the first transmission attribute information and the second transmission attribute information are different.

The first transmission attribute information may refer to address information of the accessed node and the server when the accessed node sends the connection establishment request and may specifically include at least one of the following: a first source IP address, a first source port, a first target IP address, or a first target port. The second transmission attribute information is different from the first transmission attribute information. The second transmission attribute information may refer to address information of the accessed node and the server when the accessed node sends the hole punching data to the server and may specifically include at least one of the following: a second source IP address, a second source port, a second target IP address, or a second target port. The content of at least one parameter in the second transmission attribute information is different from the content of a corresponding parameter in the first transmission attribute information. By way of example, the first target port is different from the second target port. For another example, the first source IP address is different from the second source IP address. The second initial information is the accessed extranet information formed through mapping when the NAT node sends the hole punching data to the server. In addition, since the accessed intranet information is not carried when the hole punching data is sent, the server does not know whether the second source IP address and the second source port in the second transmission attribute information are changed, and the server performs updating only according to the accessed intranet information carried in the heartbeat packet.

The first transmission attribute information and the second transmission attribute information indicate that the connection channel when the accessed node sends the connection establishment request is different from the connection channel when the accessed node sends the hole punching data to the server. Therefore, in the case where the NAT node is symmetric, source ports corresponding to two different connection channels are mapped to different accessed extranet ports so that in the case where the accessed node first sends the hole punching data to the access node and then sends the hole punching data to the server, accessed extranet ports to which two pieces of hole punching data are mapped conform to the port allocation rule applicable to the NAT node, and thus the server may predict the accessed extranet port allocated when the accessed node sends the hole punching data to the access node, that is, the second accessed extranet information, according to the second initial information.

The first transmission attribute is configured to send the connection establishment request to the server, and the second transmission attribute is configured to send the hole punching data to the server. In this manner, the accessed extranet ports for the two data transmissions are different so that the server predicts the second accessed extranet information according to the second initial information and the prediction accuracy of the accessed extranet information when the accessed node performs hole punching is improved, so as to be adapted to the application scenario of symmetric NAT nodes, thereby improving the connection success rate between the accessed node and the access node.

Optionally, types of NAT nodes include a symmetric node or a cone node, and the symmetric node maps the accessed intranet information in a port increment manner.

The types of the NAT nodes in the embodiments of the present disclosure are not limited to the cone node, but are also applicable to the symmetric node so that the connection establishment method in the embodiments of the present disclosure is widely applied to different types of NAT nodes, thereby improving the versatility of the connection establishment method and the connection success rate.

According to the technical solution of the present disclosure, the connection establishment request is sent to the server, the accessed connection information is sent through the established connection, the access connection information of the access node is received from the server, and the connection channel between the access node and the accessed node is opened up according to the access connection information so that the connection establishment request is acquired from the access node through the opened connection channel, a connection to the access node is established, a connection to the access node that does not support the TNAT function is established, and the accessed node does not need to acquire the NAT device type of the accessed node, thereby reducing the access cost of the intranet node and the complexity of the accessed node, and improving the access efficiency of the intranet node.

Figure 5:
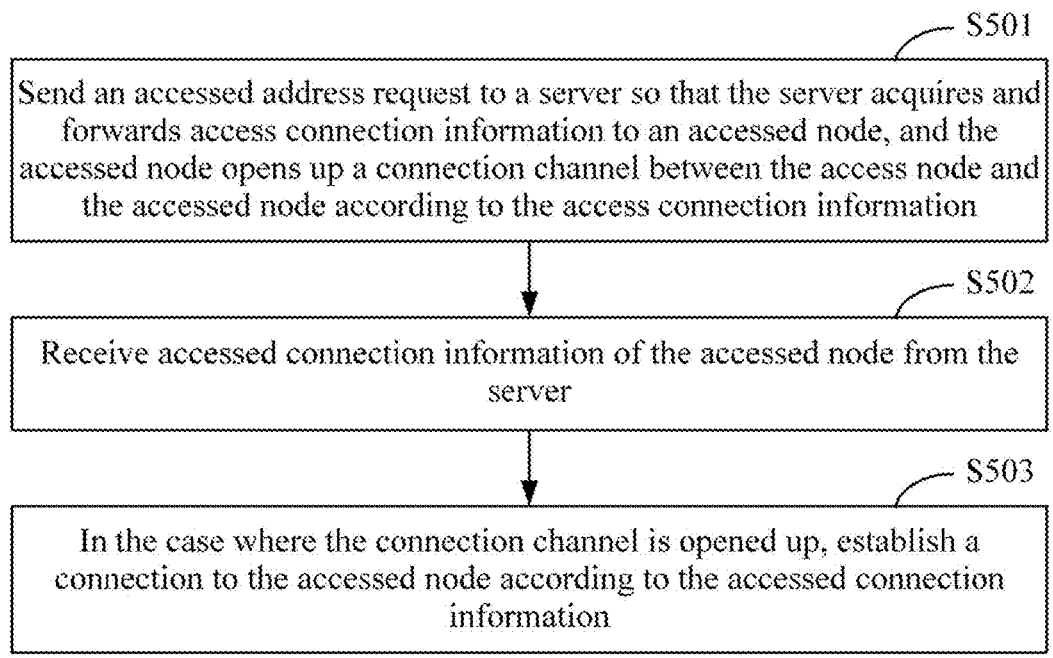
FIG. 5 is a schematic diagram of another connection establishment method according to an embodiment of the present disclosure.

FIG. 5 is a flowchart of a connection establishment method according to an embodiment of the present disclosure. This embodiment is applicable to the case where a communication connection is established between an accessed node and an access node. The method of this embodiment may be performed by a connection establishment apparatus. The apparatus may be implemented by software and/or hardware and is specifically configured in an electronic device having a certain data computing capability. The electronic device may be a client device, specifically, an access node. The client device is, for example, a mobile phone, a tablet computer, an in-vehicle terminal, or a desktop computer.

In S501, an accessed address request is sent to a server so that the server acquires and forwards access connection information to an accessed node, and the accessed node opens up a connection channel between the access node and the accessed node according to the access connection information.

The access node is specifically a node that transmits data using the standard HTTP3 or QUIC protocol.

In S502, accessed connection information of the accessed node is received from the server.

In S503, in the case where the connection channel is opened up, a connection to the accessed node is established according to the accessed connection information.

Optionally, establishing the connection to the accessed node according to the accessed connection information includes determining at least one connection channel according to the accessed connection information; establishing the connection to the accessed node by using each of the at least one connection channel and acquiring connection performance information of each of the at least one connection channel; filtering out a target channel according to the connection performance information of each of the at least one connection channel; and performing data transmission with the accessed node through the target channel.

The accessed connection information may include at least one accessed extranet port and one accessed intranet port of the access node, and one port corresponds to one connection channel. The access node may send the connection establishment request to the corresponding connection channel according to each port, so as to be adapted to connection establishment between the access node and the accessed node in different application scenarios.

The connection performance information is used for detecting whether the connection channel is successfully established and the data transmission performance of the successfully established connection channel. The target channel may refer to a connection channel that is available and has good connection performance. Since the predicted extranet port exists in the accessed connection information, some ports cannot be connected. The connection channel that is successfully connected is obtained. If at least two connection channels are successfully connected, a connection channel with better transmission quality is further filtered out according to the connection performance information. Data is transmitted through the target channel, thereby ensuring data transferability and improving the data transmission performance. By way of example, the connection performance information may include connection consumed time, and the target channel may be a connection channel with the shortest connection consumed time. Correspondingly, data is transmitted through the target channel so that the data transmission efficiency can be improved.

Connection channels with multiple ports in the accessed connection information are established, and the target channel for data transmission with the accessed node is filtered out according to the connection performance information of the connection channels, thereby ensuring connection availability and improving the connection stability and the data transmission efficiency.

If the existing access node needs to establish a connection to the server, a TNAT application (or a Software Development Kit (SDK)) needs to be installed and registered in the server before the connection to the accessed node behind the NAT device intranet is established. In the embodiment of the present disclosure, the access node may be combined with a TNAT server through the HTTP3 or QUIC protocol, the connection establishment function can be achieved without the built-in SDK, and the connection to the TNAT server is established just through the HTTP3 or QUIC protocol so that the accessed connection information of the accessed node is acquired and the connection to the accessed node is established.

According to the technical solution of the present disclosure, the access node sends the accessed address request to the server, acquires the accessed connection information of the accessed node, and establishes a connection to the accessed node according to the accessed connection information in the case where the connection channel is opened up. In this manner, the access node establishes a connection to the accessed node through the opened connection channel, a connection between the access node that does not support the TNAT function and the accessed node located behind the NAT device is achieved, and the access node does not need to have the TNAT device function, thereby reducing the access cost of the intranet node, reducing the complexity of the access node, enriching the application scenarios of the access node, and improving the access efficiency of the intranet node.

Figure 6:
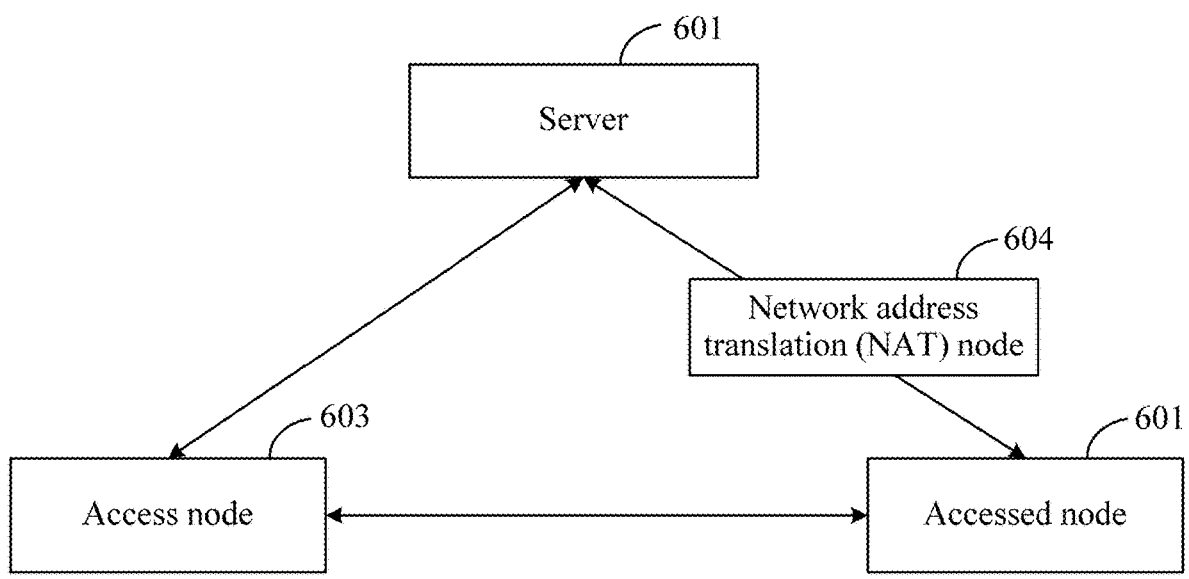
FIG. 6 is a schematic diagram illustrating a scenario of another connection establishment method according to an embodiment of the present disclosure.

FIG. 6 is a schematic diagram illustrating a scenario of another connection establishment method according to an embodiment of the present disclosure. A connection establishment system includes a server 601, an accessed node 602, and an access node 603. In addition, data is forwarded from the accessed node 602 to the extranet through an NAT node 604. The server 601 is an auxiliary TNAT server and establishes the QUIC connection to the access node 603 and the accessed node 602, respectively. The connection establishment method may include the following.

The server 601 listens to two types of ports, one of which is a QUIC port (one QUIC port exists) and the other of which is a normal UDP port (multiple normal UDP ports exist, or the normal UDP port exists in a UDP promiscuous mode). The QUIC port is used for the hole punching of Cone, and the UDP port is used for predicting a port allocated by the symmetric NAT node 604, where a port allocation rule of the symmetric NAT node 604 may be a port increment law. An access (connection establishment) request of the access node 603 or the accessed node 602 is sent through the port, the QUIC port is a port for receiving the connection establishment request of the access node 603 and the accessed node 602, and the normal UDP port is for receiving only a UDP request of the accessed node 602. The preceding two types of ports are configured in the server 601, the access node 603, and the accessed node 602, and the connection request between the access node 603 and the accessed node 602 is achieved through the ports.

Based on the first transmission attribute information which specifically includes the first accessed intranet IP address, the first accessed intranet port, the first server IP address and the first server port, the accessed node 602 sends a QUIC connection establishment request to the server 601 to establish a QUIC long connection channel with the server 601 (the address is a QUIC IP address+QUIC port of the server 601), where the connection establishment request specifically includes <control connection establishment message>, the message includes [intranet IP, intranet port] of the accessed node 602 and performs periodic heartbeats (the period<30 seconds), and the content of the heartbeat packet is the same as <control connection establishment message>. The packet body of the connection establishment request and the heartbeat packet carries the accessed intranet information, specifically the first accessed intranet IP address and the first accessed intranet port. The NAT node 604 maps the first accessed intranet IP address and the first accessed intranet port so as to obtain the first accessed extranet information, specifically the first accessed extranet IP address and the first accessed extranet port.

The server 601 records a piece of information ([server IP address, server port], [first accessed extranet IP address, first accessed extranet port (QUIC port)], [first accessed intranet IP address, first accessed intranet port]) for the accessed node 602, and the server 601 replies to the accessed node 602 with <success QUIC connection establishment> information. If the extranet address of the accessed node 602 changes, the record is updated in time.

The access node 603 initiates the QUIC connection request, specifically, the accessed address request, to the server 601, (the address is the QUIC IP address+QUIC port of the server 601), the request is <request for accessed connection address>, and the packet body carries ([access intranet IP address, access intranet port]) of the access node 603. The server 601 may extract the access intranet information, specifically, the access intranet IP address and the access intranet port, from the packet body, and in the case where the access node 603 is located behind the NAT node, the server 601 may acquire the first initial information formed by mapping the access intranet IP address and the access intranet port through the NAT node, specifically, the access extranet IP address and the access extranet port.

The server 601 acquires the first initial information of the access node 603 and determines the access extranet IP address and the access extranet port. The first port adjustment amount is 1, and the calculation method is increment. According to the first port adjustment amount, the access extranet port in the initial information is adjusted, it is determined that the candidate information includes the access extranet IP address and access extranet port +1, and the first initial information and the candidate information, that is, ([access extranet IP address, access extranet port], [access extranet IP address, access extranet port +1]) are used as <auxiliary TNAT> and determined to be the access connection information which is then sent to the accessed node 602 through the QUIC control channel.

The accessed node 602 adopts the first transmission attribute information, which specifically includes the first accessed intranet IP address, the first accessed intranet port, the first server IP address and the first server port (that is, the same as an address of QUIC connection establishment of the server 601), and sends the hole punching data, that is, a <PUNCH> message, to the access connection information, that is, two addresses in the <auxiliary TNAT> packet, respectively. The purpose is to adapt to the case where the type of the NAT node existing in the access node 603 is Cone (a term defined in a Traversal Using Relay NAT (TURN) protocol) or Symmetric of the port increment rule and hole punching is performed on the NAT node of the accessed node 602. The content in <PUNCH> is not limited. Actually, the connection channel corresponding to the access extranet port is opened up, and the connection channel corresponding to access extranet port +1 is opened up.

The accessed node 602 adopts new second transmission attribute information, randomly selects a UDP port of the server 601, and sends the hole punching data, that is, a <PUNCH> message to the server 601. To prevent packet loss, the hole punching data is sent for 10 times in succession with an interval of 5 milliseconds each time. The second transmission attribute information specifically includes the second accessed intranet IP address, the second accessed intranet port, the second server IP address, and the second server port, where at least one parameter in the first transmission attribute information is different from the corresponding parameter in the second transmission attribute information.

The server 601 receives a PUNCH data packet from the accessed node 602 and obtains the second initial information of the accessed node 602, where the second initial information specifically includes the second accessed extranet IP address and the second accessed extranet port (the UDP port). The number of the second port adjustment amounts is determined according to the number of the first port adjustment amounts, the value of the second port adjustment amount is determined to be 1 according to the port increment rule, and the second initial information is adjusted based on the second port adjustment amount so as to determine the second accessed extranet information. The second accessed extranet information, the first accessed extranet information and the accessed intranet information are determined to be the accessed connection information. A <returning the accessed connection address> message is sent through the QUIC channel of the access node 603 of the preceding connection establishment, and the packet includes data ([first accessed extranet IP address, first accessed extranet port], [first accessed intranet IP address, first accessed intranet port], [first accessed extranet IP address, extranet port −1 in the second initial information], [first accessed extranet IP address, extranet port −2 in the second initial information]) (−1 and −2 are set based on the port increment rule). The accessed connection information is sent to the access node 603, where the occasion of sending <returning the accessed connection address> of the accessed connection information is min (200 ms after the QUIC request, that is, the accessed address request, of the access node 603 is received, the PUNCH packet of the accessed node 602 is received). 200 ms after the QUIC request, that is, the accessed address request, of the access node 603 is received indicates that the server 601 may send only ([first accessed extranet IP address, first accessed extranet port], [first accessed intranet IP address, first accessed intranet port]), that is, the accessed connection information in this case includes only the first accessed extranet information and the accessed intranet information. Receiving the PUNCH packet of the accessed node 602 indicates that the server 601 sends ([first accessed extranet IP address, first accessed extranet port], [first accessed intranet IP address, first accessed intranet port], [first accessed extranet IP address, extranet port −1 in the second initial information], [first accessed extranet IP address, extranet port −2 in the second initial information]), that is, the accessed connection information in this case includes the second accessed extranet information, the first accessed extranet information, and the accessed intranet information. In a UDP port mode, in the case where the accessed node 602 is of the Symmetric type with a port increment rule, the port used by the accessed node 602 to send Punch to the access node 603 is guessed according to a new UDP session. Internal ports are directly connected, and internal addresses of some operators may communicate with each other.

The access node 603 initiates a QUIC connection to the accessed connection information, that is, each address in a <returning the accessed address> address list, so as to establish at least one QUIC connection channel. If multiple addresses to which the connection is successful exist, a connection channel with the shortest connection consumed time is selected and determined to be the target channel, and it is determined that the QUIC hole punching and connection establishment are successful so that the connection between the access node 603 and the accessed node 602 is successfully established and data transmission is performed. The QUIC protocol may also be IQUIC, or GQUIC, and other extended QUIC protocols.

According to the technical solution of the present disclosure, an access terminal is allowed to use the standard QUIC/HTTP3 protocol for connection to devices on the NAT intranet, and the access terminal does not need to implement a TNAT client function, thereby reducing the complexity of the access terminal; and extension is made so as to support the Symmetric NAT traversal with the port increment rule, thereby improving the success rate of NAT traversal. Access terminals are all applications and protocols (such as HTTP3, a browser, or the QUIC protocol) that use the QUIC transmission protocol, whether the access terminal is on the NAT intranet is not limited, the plug-in for the NAT client function does not need to be installed on the access terminal, and the access terminal may be connected to and access the devices on the NAT intranet. The access terminal is an application using the HTTP3 protocol, and HTTP3 is a standard for the next generation of HTTP (currently HTTP2). In the Internet of Things and cloud computing, a large number of devices are deployed on the intranet, and the application scenarios are widely speculated.

Figure 7:
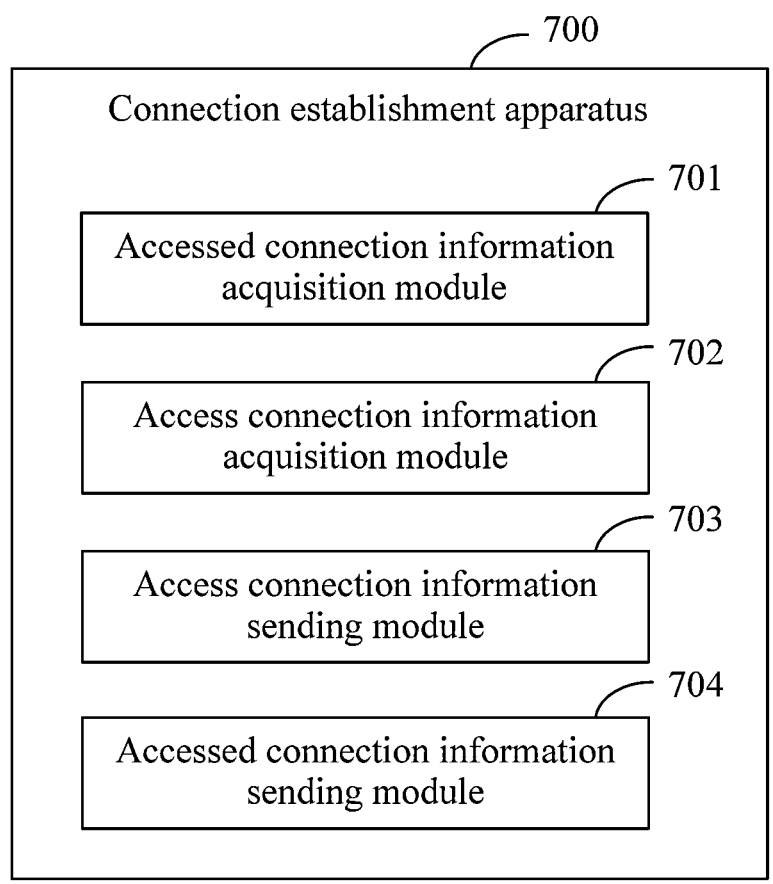
FIG. 7 is a schematic diagram of a connection establishment apparatus according to an embodiment of the present disclosure.

According to an embodiment of the present disclosure, FIG. 7 is a structural diagram of a connection establishing apparatus according to an embodiment of the present disclosure, and the embodiment of the present disclosure is applicable to the case where a communication connection is established between an accessed node and an access node. The apparatus is implemented by software and/or hardware and is specifically configured in an electronic device having a certain data computing capability.

As shown in FIG. 7, a connection establishment apparatus 700 includes an accessed connection information acquisition module 701, an access connection information acquisition module 702, an access connection information sending module 703, and an accessed connection information sending module 704.

The accessed connection information acquisition module 701 is configured to receive a connection establishment request from an accessed node, establish a connection to the accessed node, and acquire accessed connection information of the accessed node.

The access connection information acquisition module 702 is configured to receive an accessed address request from an access node and determine access connection information of the access node.

The access connection information sending module 703 is configured to send the access connection information to the accessed node so that the accessed node opens up a connection channel between the access node and the accessed node according to the access connection information.

The accessed connection information sending module 704 is configured to send the accessed connection information of the accessed node to the access node so that the access node establishes a connection to the accessed node according to the accessed connection information in the case where the connection channel is opened up.

According to the technical solution of the present disclosure, the connection establishment request is acquired from the accessed node, the accessed connection information of the accessed node is acquired, the accessed address request is received from the access node, the access connection information of the access node is acquired, and the access connection information is sent to the accessed node. In this manner, the accessed node opens up the connection channel between the access node and the accessed node and sends the accessed connection information to the access node so that the access node establishes a connection to the accessed node through the opened connection channel. Therefore, a connection assistance function of the accessed node is provided for the access node that does not support the TNAT function, a connection between the access node and the accessed node behind the NAT device is achieved, and the access node does not need to have the TNAT device function, thereby reducing the access cost of the intranet node, reducing the complexity of the access node, enriching application scenarios of the access node, and improving the access efficiency of the intranet node.

Further, the accessed connection information includes first accessed extranet information and accessed intranet information.

Further, the connection establishment apparatus further includes a second accessed extranet information acquisition module and an accessed connection information updating module. The second accessed extranet information acquisition module is configured to acquire hole punching data from the accessed node and determine second accessed extranet information according to the hole punching data previously sent from the accessed node to the access node. The accessed connection information updating module is configured to update the accessed connection information according to the second accessed extranet information.

Further, the access connection information acquisition module 702 includes an initial information acquisition unit, a candidate information acquisition unit, and an access connection information determination unit. The initial information acquisition unit is configured to acquire first initial information of the access node according to the accessed address request. The candidate information acquisition unit is configured to determine candidate information of the access node according to the first initial information and a first port adjustment amount. The access connection information determination unit is configured to determine the candidate information and the first initial information to be the access connection information of the access node.

Further, the second accessed extranet information acquisition module includes a second initial information acquisition unit, a port adjustment amount determination unit, and an initial information adjustment unit. The second initial information acquisition unit is configured to determine second initial information of the accessed node according to the hole punching data. The port adjustment amount determination unit is configured to determine a second port adjustment amount according to the first port adjustment amount. The initial information adjustment unit is configured to adjust the second initial information according to the second port adjustment amount to determine the second accessed extranet information of the accessed node.

Further, the server establishes a QUIC connection to the accessed node, and the server establishes a QUIC connection to the access node.

The connection establishment apparatus may perform the connection establishment method according to any embodiment of the present disclosure and has functional modules and beneficial effects corresponding to the executed connection establishment method.

Figure 8:
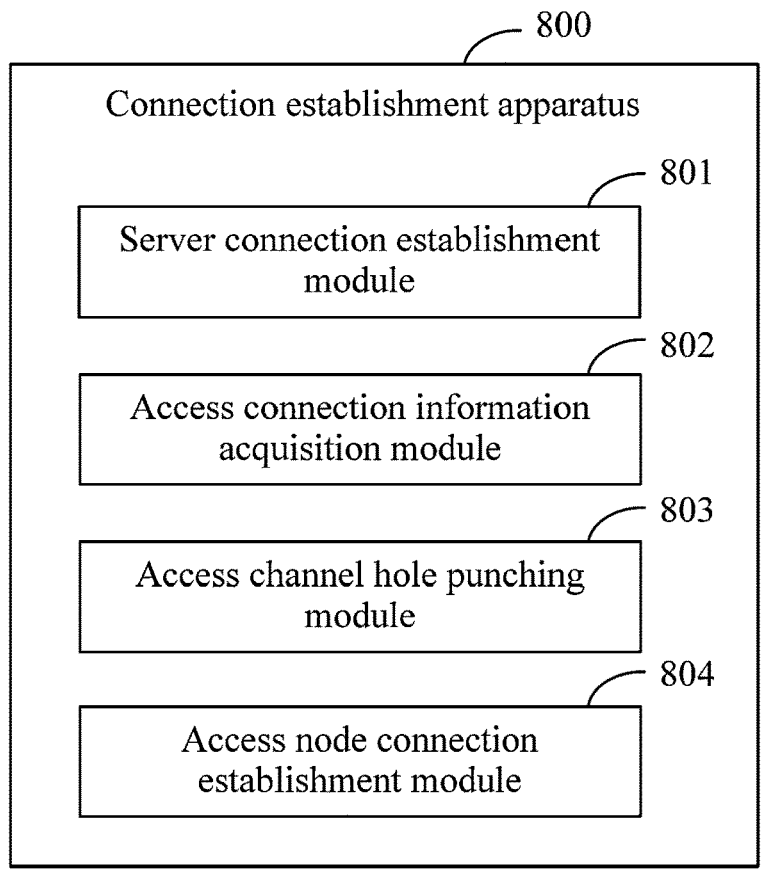
FIG. 8 is a schematic diagram of a connection establishment apparatus according to an embodiment of the present disclosure.

According to an embodiment of the present disclosure, FIG. 8 is a structural diagram of a connection establishing apparatus according to an embodiment of the present disclosure, and the embodiment of the present disclosure is applicable to the case where a communication connection is established between an accessed node and an access node. The apparatus is implemented by software and/or hardware and is specifically configured in an electronic device having a certain data computing capability.

As shown in FIG. 8, a connection establishment apparatus 800 includes a server connection establishment module 801, an access connection information acquisition module 802, an access channel hole punching module 803, and an access node connection establishment module 804.

The server connection establishment module 801 is configured to send a connection establishment request to a server and establish a connection to the server so that the server acquires and forwards accessed connection information to an access node.

The access connection information acquisition module 802 is configured to receive access connection information of the access node from the server.

The access channel hole punching module 803 is configured to send hole punching data to the access node according to the access connection information to open up a connection channel between the access node and the accessed node.

The access node connection establishment module 804 is configured to receive the connection establishment request from the access node according to the accessed connection information and establish a connection to the access node.

According to the technical solution of the present disclosure, the connection establishment request is sent to the server, the accessed connection information is sent through the established connection, the access connection information of the access node is received from the server, and the connection channel between the access node and the accessed node is opened up according to the access connection information so that the connection establishment request is acquired from the access node through the opened connection channel, a connection to the access node is established, a connection to the access node that does not support the TNAT function is established, and the accessed node does not need to acquire the NAT device type of the accessed node, thereby reducing the access cost of the intranet node and the complexity of the accessed node, and improving the access efficiency of the intranet node.

Further, the server connection establishment module 801 includes a network address translation unit configured to send the connection establishment request to an NAT node and send the connection establishment request to the server through the NAT node; where the connection establishment request is used for the server to acquire the accessed connection information, where the accessed connection information includes first accessed extranet information and accessed intranet information.

Optionally, the network address translation unit is specifically configured to send the connection establishment request to the server through the NAT node according to first transmission attribute information, where the accessed intranet information is mapped through the NAT node based on the first transmission attribute information so as to obtain the first accessed extranet information; the connection establishment method further includes in the case where the hole punching data is sent to the access node, sending the hole punching data to the NAT node and sending the hole punching data to the server through the NAT node according to second transmission attribute information so that the server acquires second initial information and determines second accessed extranet information; where the accessed intranet information is mapped through the NAT node based on the second transmission attribute information so as to obtain the second initial information, and the first transmission attribute information and the second transmission attribute information are different.

The connection establishment apparatus may perform the connection establishment method according to any embodiment of the present disclosure and has functional modules and beneficial effects corresponding to the executed connection establishment method.

Figure 9:
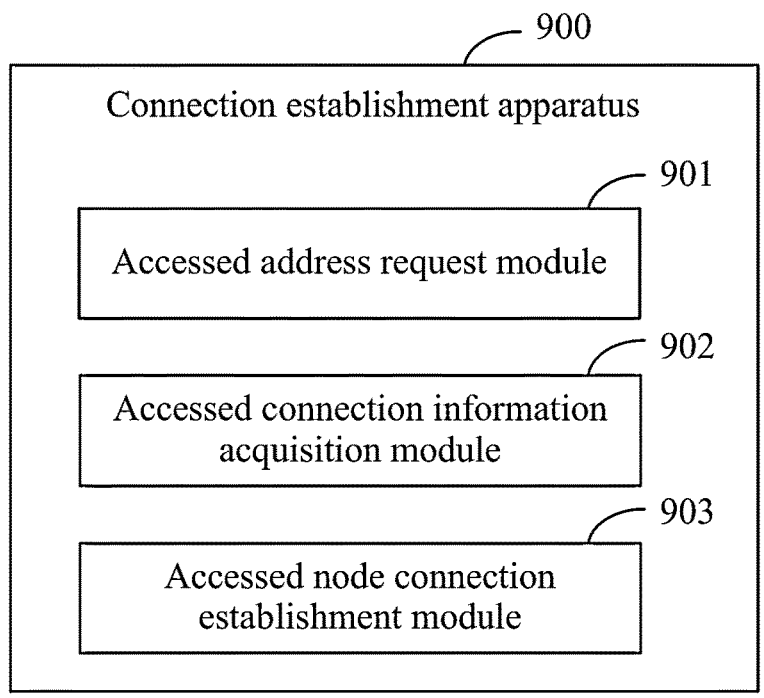
FIG. 9 is a schematic diagram of a connection establishment apparatus according to an embodiment of the present disclosure.

According to an embodiment of the present disclosure, FIG. 9 is a structural diagram of a connection establishing apparatus according to an embodiment of the present disclosure, and the embodiment of the present disclosure is applicable to the case where a communication connection is established between an accessed node and an access node. The apparatus is implemented by software and/or hardware and is specifically configured in an electronic device having a certain data computing capability.

As shown in FIG. 9, a connection establishment apparatus 900 includes an accessed address request module 901, an accessed connection information acquisition module 902, and an accessed node connection establishment module 903.

The accessed address request module 901 is configured to send an accessed address request to a server so that the server acquires and forwards access connection information to an accessed node, and the accessed node opens up a connection channel between the access node and the accessed node according to the access connection information.

The accessed connection information acquisition module 902 is configured to receive accessed connection information of the accessed node from the server.

The accessed node connection establishment module 903 is configured to, in the case where the connection channel is opened up, establish a connection to the accessed node according to the accessed connection information.

According to the technical solution of the present disclosure, the access node sends the accessed address request to the server, acquires the accessed connection information of the accessed node, and establishes a connection to the accessed node according to the accessed connection information in the case where the connection channel is opened up. In this manner, the access node establishes a connection to the accessed node through the opened connection channel, a connection between the access node that does not support the TNAT function and the accessed node located behind the NAT device is achieved, and the access node does not need to have the TNAT device function, thereby reducing the access cost of the intranet node, reducing the complexity of the access node, enriching the application scenarios of the access node, and improving the access efficiency of the intranet node.

Further, the accessed node connection establishment module 903 includes a connection channel determination unit, a channel performance detection unit, a connection channel filtering unit, and a data transmission unit. The connection channel determination unit is configured to determine at least one connection channel according to the accessed connection information. The channel performance detection unit is configured to establish the connection to the accessed node by using each of the at least one connection channel and acquire connection performance information of each of the at least one connection channel. The connection channel filtering unit is configured to filter out a target channel according to the connection performance information of each of the at least one connection channel. The data transmission unit is configured to perform data transmission with the accessed node through the target channel.

The connection establishment apparatus may perform the connection establishment method according to any embodiment of the present disclosure and has functional modules and beneficial effects corresponding to the executed connection establishment method.

In the technical solutions of the present disclosure, the collection, storage, use, processing, transmission, provision, and disclosure of user personal information involved are in compliance with provisions of relevant laws and regulations and do not violate public order and good customs.

According to an embodiment of the present disclosure, the present disclosure further provides an electronic device, a readable storage medium, and a computer program product.

Figure 10:
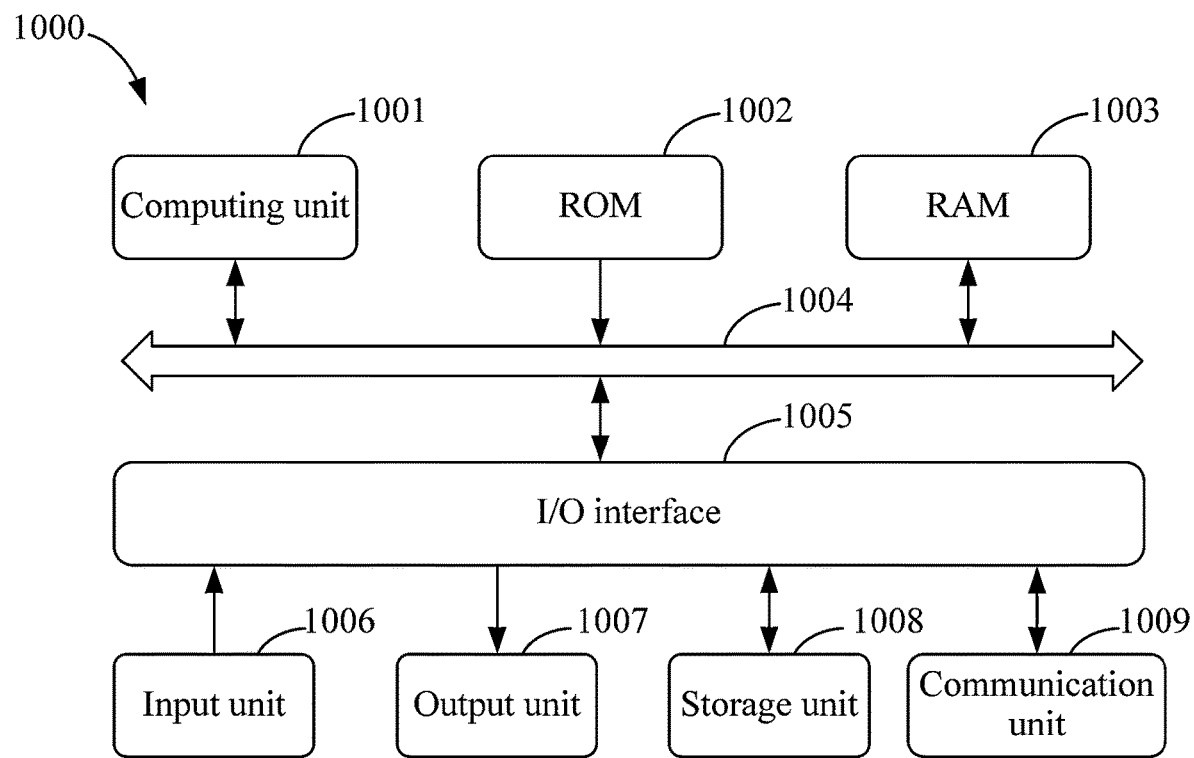
FIG. 10 is a block diagram of an electronic device for performing a connection establishment method according to an embodiment of the present disclosure.

FIG. 10 is a block diagram illustrative of an exemplary electronic device 1000 that may be used for implementing the embodiments of the present disclosure. The electronic device is intended to represent various forms of digital computers, for example, a laptop computer, a desktop computer, a workbench, a personal digital assistant, a server, a blade server, a mainframe computer, or another applicable computer. The electronic device may also represent various forms of mobile apparatuses, for example, a personal digital assistant, a cellphone, a smartphone, a wearable device, or a similar computing apparatus. Herein the shown components, the connections and relationships between these components, and the functions of these components are illustrative only and are not intended to limit the implementation of the present disclosure as described and/or claimed herein.

As shown in FIG. 10, the device 1000 includes a computing unit 1001. The computing unit 1001 may perform various appropriate actions and processing according to a computer program stored in a read-only memory (ROM) 1002 or a computer program loaded into a random-access memory (RAM) 1003 from a storage unit 1008. Various programs and data required for the operation of the device 1000 may also be stored in the RAM 1003. The computing unit 1001, the ROM 1002, and the RAM 1003 are connected to each other through a bus 1004. An input/output (I/O) interface 1005 is also connected to the bus 1004.

Multiple components in the device 1000 are connected to the I/O interface 1005. The multiple components include an input unit 1006 such as a keyboard or a mouse, an output unit 1007 such as various types of displays or speakers, the storage unit 1008 such as a magnetic disk or an optical disc, and a communication unit 1009 such as a network card, a modem or a wireless communication transceiver. The communication unit 1009 allows the device 1000 to exchange information/data with other devices over a computer network such as the Internet and/or various telecommunications networks.

The computing unit 1001 may be various general-purpose and/or special-purpose processing components having processing and computing capabilities. Examples of the computing unit 1001 include, but are not limited to, a central processing unit (CPU), a graphics processing unit (GPU), a special-purpose artificial intelligence (AI) computing chip, a computing unit executing machine learning models and algorithms, a digital signal processor (DSP), and any appropriate processor, controller and microcontroller. The computing unit 1001 performs various methods and processing described above, such as the connection establishment method. For example, in some embodiments, the connection establishment method may be implemented as a computer software program tangibly contained in a machine-readable medium such as the storage unit 1008. In some embodiments, part or all of computer programs may be loaded and/or installed on the device 1000 via the ROM 1002 and/or the communication unit 1009. When the computer program is loaded into the RAM 1003 and executed by the computing unit 1001, one or more steps of the preceding connection establishment method may be performed. Alternatively, in other embodiments, the computing unit 1001 may be configured, in any other suitable manner (for example, by means of firmware), to perform the connection establishment method.

Herein various embodiments of the preceding systems and techniques may be implemented in digital electronic circuitry, integrated circuitry, field-programmable gate arrays (FPGAs), application-specific integrated circuits (ASICs), application-specific standard products (ASSPs), systems on chips (SoCs), complex programmable logic devices (CPLDs), computer hardware, firmware, software, and/or combinations thereof. The various embodiments may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input apparatus, and at least one output apparatus and transmitting data and instructions to the memory system, the at least one input apparatus, and the at least one output apparatus.

Program codes for implementation of the methods of the present disclosure may be written in one programming language or any combination of multiple programming languages. The program codes may be provided for the processor or controller of a general-purpose computer, a special-purpose computer, or another programmable data processing apparatus to enable functions/operations specified in flowcharts and/or block diagrams to be implemented when the program codes are executed by the processor or controller. The program codes may be executed entirely on a machine or may be executed partly on a machine. As a stand-alone software package, the program codes may be executed partly on a machine and partly on a remote machine or may be executed entirely on a remote machine or a server.

In the context of the present disclosure, the machine-readable medium may be a tangible medium that may include or store a program that is used by or used in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof. More specific examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device, or any suitable combination thereof.

In order that interaction with a user is provided, the systems and techniques described herein may be implemented on a computer. The computer has a display apparatus (for example, a cathode-ray tube (CRT) or a liquid-crystal display (LCD) monitor) for displaying information to the user and a keyboard and a pointing apparatus (for example, a mouse or a trackball) through which the user can provide input to the computer. Other types of apparatuses may also be used for providing interaction with a user. For example, feedback provided for the user may be sensory feedback in any form (for example, visual feedback, auditory feedback, or haptic feedback). Moreover, input from the user may be received in any form (including acoustic input, voice input, or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein), or a computing system including any combination of such back-end, middleware or front-end components. Components of a system may be interconnected by any form or medium of digital data communication (for example, a communication network). Examples of the communication network include a local area network (LAN), a wide area network (WAN) and the Internet.

A computing system may include a client and a server. The client and the server are usually far away from each other and generally interact through the communication network. The relationship between the client and the server arises by virtue of computer programs running on respective computers and having a client-server relationship to each other. The server may be a cloud server, a server of a distributed system, or a server combined with a blockchain.

It is to be understood that various forms of the preceding flows may be used with steps reordered, added, or removed. For example, the steps described in the present disclosure may be executed in parallel, in sequence or in a different order as long as the desired results of the technical solutions disclosed in the present disclosure can be achieved. The execution sequence of these steps is not limited herein.

The scope of the present disclosure is not limited to the preceding embodiments. It is to be understood by those skilled in the art that various modifications, combinations, subcombinations, and substitutions may be made according to design requirements and other factors. Any modification, equivalent substitution, improvement and the like made within the spirit and principle of the present disclosure falls within the scope of the present disclosure.

What is claimed is:

1. A connection establishment method, applied to a server, comprising:
   receiving a connection establishment request from an accessed node, establishing a connection to the accessed node, and acquiring accessed connection information of the accessed node;
   receiving an accessed address request from an access node and determining access connection information of the access node;
   sending the access connection information to the accessed node so that the accessed node opens up a connection channel between the access node and the accessed node according to the access connection information; and
   sending the accessed connection information of the accessed node to the access node so that the access node establishes a connection to the accessed node according to the accessed connection information in a case where the connection channel is opened up;
   wherein determining the access connection information of the access node comprises:
   acquiring first initial information of the access node according to the accessed address request;
   determining candidate information of the access node according to the first initial information and a first port adjustment amount; and
   determining the candidate information and the first initial information to be the access connection information of the access node.

2. The method of claim 1, wherein the accessed connection information comprises first accessed extranet information and accessed intranet information.

3. The method of claim 2, further comprising:
   acquiring hole punching data from the accessed node and determining second accessed extranet information according to the hole punching data previously sent from the accessed node to the access node; and
   updating the accessed connection information according to the second accessed extranet information.

4. The method of claim 1, wherein determining the second accessed extranet information according to the hole punching data previously sent from the accessed node to the access node comprises:
   determining second initial information of the accessed node according to the hole punching data;
   determining a second port adjustment amount according to the first port adjustment amount; and
   adjusting the second initial information according to the second port adjustment amount to determine the second accessed extranet information of the accessed node.

5. The method of claim 1, wherein the server separately establishes a Quick User Datagram Protocol (UDP) Internet Connection (QUIC) connection to the accessed node and the access node.

6. A connection establishment method applied to an accessed node, comprising:
   sending a connection establishment request to a server and establishing a connection to the server so that the server acquires accessed connection information of the accessed node and forward the accessed connection information to an access node;
   receiving access connection information of the access node from the server, wherein the access connection information of the access node is determined according to candidate information of the access node and first initial information of the access node, the first initial information of the access node is acquired according to the accessed address request of the access node, and the candidate information of the access node is determined according to the first initial information and a first port adjustment amount;
   sending hole punching data to the access node according to the access connection information to open up a connection channel between the access node and the accessed node; and
   receiving the connection establishment request from the access node according to the accessed connection information and establishing a connection to the access node.

7. The method of claim 6, wherein sending the connection establishment request to the server comprises:
   sending the connection establishment request to a network address translation (NAT) node and sending the connection establishment request to the server through the NAT node;
   wherein the connection establishment request is used for the server to acquire the accessed connection information, wherein the accessed connection information comprises first accessed extranet information and accessed intranet information.

8. The method of claim 7, wherein sending the connection establishment request to the server through the NAT node comprises:
   sending the connection establishment request to the server through the NAT node according to first transmission attribute information, wherein the accessed intranet information is mapped through the NAT node based on the first transmission attribute information so as to obtain the first accessed extranet information;
   wherein the method further comprises:
   in a case where the hole punching data is sent to the access node, sending the hole punching data to the NAT node and sending the hole punching data to the server through the NAT node according to second transmission attribute information so that the server acquires second initial information and determines second accessed extranet information;

wherein the accessed intranet information is mapped through the NAT node based on the second transmission attribute information so as to obtain the second initial information, and the first transmission attribute information and the second transmission attribute information are different.

9. A connection establishment method applied to an access node, comprising:

sending an accessed address request to a server so that the server acquires access connection information of the access node and forward the access connection information to an accessed node so that the accessed node opens up a connection channel between the access node and the accessed node according to the access connection information;

receiving accessed connection information of the accessed node from the server, wherein the access connection information of the access node is determined according to candidate information of the access node and first initial information of the access node, the first initial information of the access node is acquired according to the accessed address request, and the candidate information of the access node is determined according to the first initial information and a first port adjustment amount; and in a case where the connection channel is opened up, establishing a connection to the accessed node according to the accessed connection information.

10. The method of claim 9, wherein establishing the connection to the accessed node according to the accessed connection information comprises:

determining at least one connection channel according to the accessed connection information;

establishing the connection to the accessed node by using each of the at least one connection channel and acquiring connection performance information of each of the at least one connection channel;

filtering out a target channel according to the connection performance information of each of the at least one connection channel; and performing data transmission with the accessed node through the target channel.

11. A server, comprising:
at least one processor; and
a memory communicatively connected to the at least one processor,
wherein the memory stores instructions executable by the at least one processor to enable the at least one processor to perform the connection establishment method of claim 1.

12. An accessed node, comprising:
at least one processor; and
a memory communicatively connected to the at least one processor,
wherein the memory stores instructions executable by the at least one processor to enable the at least one processor to perform the connection establishment method of claim 6.

13. An access node, comprising:
at least one processor; and
a memory communicatively connected to the at least one processor,
wherein the memory stores instructions executable by the at least one processor to enable the at least one processor to perform the connection establishment method of claim 9.

14. A non-transitory computer-readable storage medium storing computer instructions for causing a computer to perform the connection establishment method of claim 1.

15. A non-transitory computer-readable storage medium storing computer instructions for causing a computer to perform the connection establishment method of claim 6.

16. A non-transitory computer-readable storage medium storing computer instructions for causing a computer to perform the connection establishment method of claim 9.

* * * * *